United States Patent
Davis et al.

(10) Patent No.: US 7,180,601 B1
(45) Date of Patent: Feb. 20, 2007

(54) OPTICAL SYSTEM FEATURING CHIRPED BRAGG GRATING ETALON FOR PROVIDING PRECISE REFERENCE WAVELENGTHS

(75) Inventors: Michael A. Davis, Glastonbury, CT (US); David R. Fournier, Ashford, CT (US)

(73) Assignee: CiDRA Corporation, Wallingford, CT (US)

(*) Notice: Subject to any disclaimer, the term of this patent is extended or adjusted under 35 U.S.C. 154(b) by 1082 days.

(21) Appl. No.: 09/703,823

(22) Filed: Nov. 1, 2000

(51) Int. Cl.
*G01B 9/02* (2006.01)

(52) U.S. Cl. .................................... 356/480
(58) Field of Classification Search ................ 356/480, 356/477, 478, 519, 35.5, 481, 479; 385/12; 250/227.27, 227.19
See application file for complete search history.

(56) References Cited

U.S. PATENT DOCUMENTS

| | | | |
|---|---|---|---|
| 5,615,289 A * | 3/1997 | Duck et al. | 385/24 |
| 5,754,293 A * | 5/1998 | Farhadiroushan | 356/478 |
| 5,892,582 A | 4/1999 | Bao et al. | |
| 6,097,487 A * | 8/2000 | Kringlebotn et al. | 356/450 |
| 6,374,006 B1 * | 4/2002 | Islam et al. | 385/15 |
| 6,403,949 B1 * | 6/2002 | Davis et al. | 250/227.27 |

OTHER PUBLICATIONS

Rao, Yun-Jiang. "In-fibre Bragg grating sensors". Meas. Sci. Technol. 8 (1997)., pp. 355-375.*
Othonos, Andreas. "Fiber Bragg gratings". Rev. Sci. Instrum. 68 (12), Dec. 1997, pp. 4309-4341.*
Forster, R.J. et al. "Narrow Linewidth Operation of an Erbium Fiber Laser Containing a Chirped Bragg Grating Etalon". Journal of Lightwave Technology, vol. 15, No. 11, Nov. 1997, pp. 2130-2136.*

* cited by examiner

*Primary Examiner*—Gregory J. Toatley, Jr.
*Assistant Examiner*—Michael A. Lyons

(57) ABSTRACT

An optical system has a broadband source and a chirped Bragg grating etalon. In operation, the broadband source provides a broadband optical signal. The chirped Bragg grating etalon responds to the broadband optical signal, for providing a chirped Bragg grating etalon optical signal having a precise set of the optical reference signals. The chirped Bragg grating etalon may include a pair of chirped Bragg gratings. The precise set of the optical reference signals is determined by the spacing of the chirped Bragg gratings of the chirped Bragg grating etalon. The precise set of the optical reference signals includes a series of peaks covering most of a source spectral width of the broad optical source signal with the power at the beginning and end of the spectrum passed unaffected by the chirped Bragg grating etalon due to the limited bandwidth thereof.

20 Claims, 5 Drawing Sheets

THE BASIC INVENTION

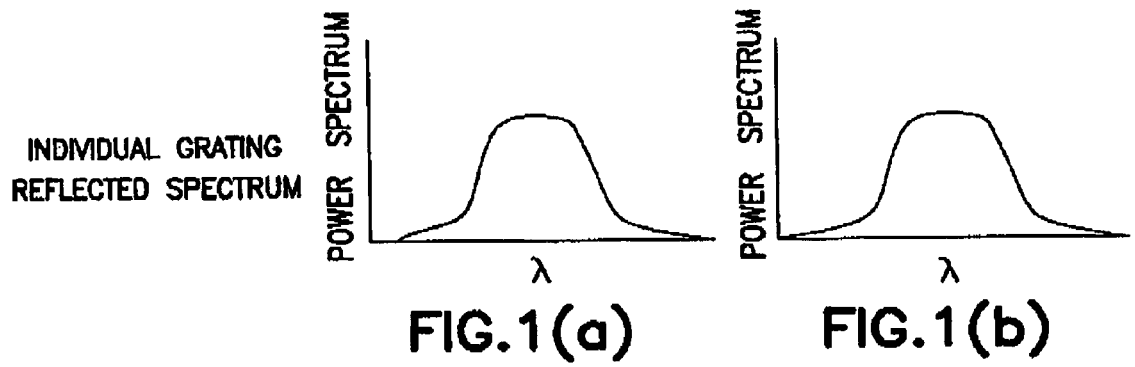
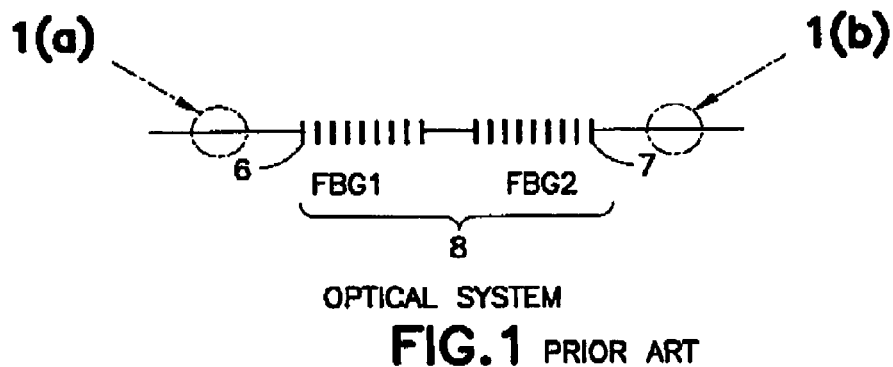
FIG. 1 PRIOR ART
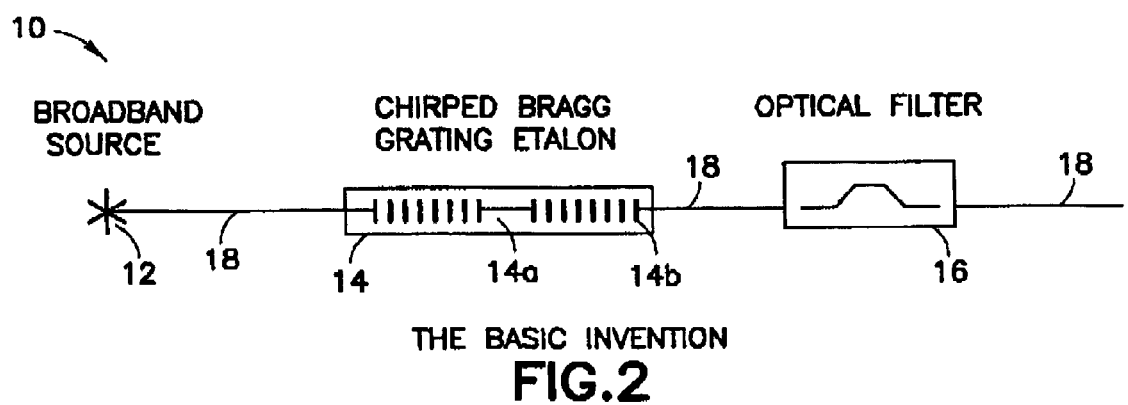
THE BASIC INVENTION
FIG. 2

AN OPTICAL SYSTEM

CHIRPED BRAGG GRATING ETALON
AND BROADBAND SOURCE COMBINATION

THE OPTICAL BANDPASS FILTER

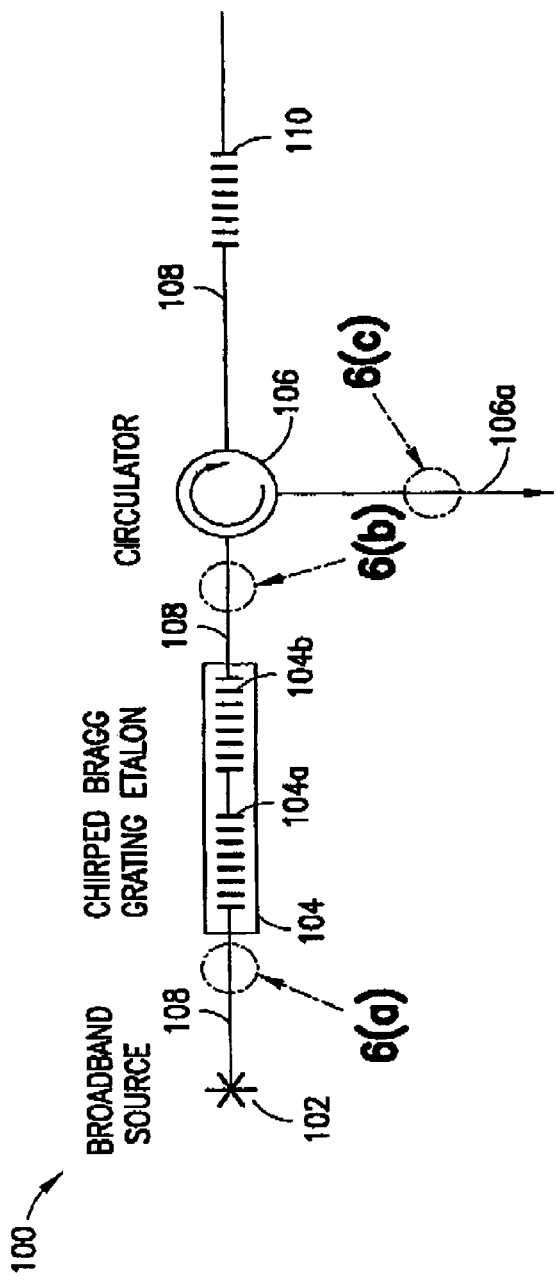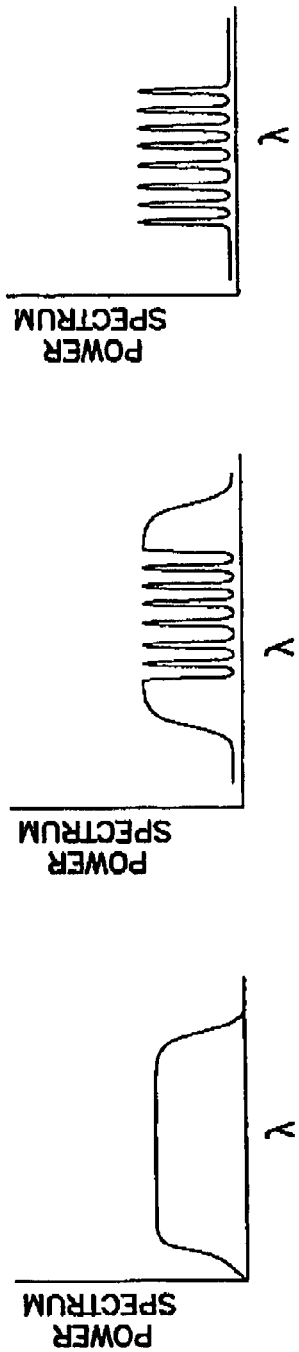

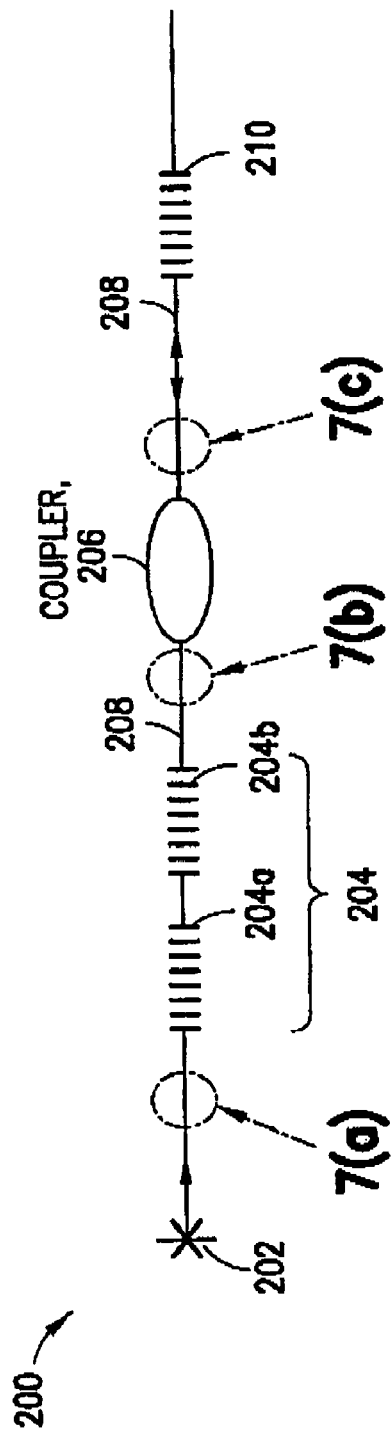
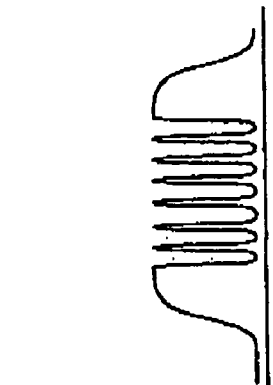
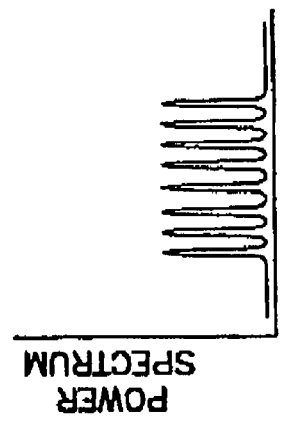
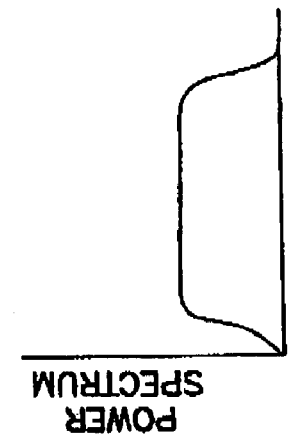
FIG. 7 ALTERNATIVE EMBODIMENT
FIG. 7(a)
FIG. 7(b)
FIG. 7(c)

US 7,180,601 B1

OPTICAL SYSTEM FEATURING CHIRPED BRAGG GRATING ETALON FOR PROVIDING PRECISE REFERENCE WAVELENGTHS

BACKGROUND OF INVENTION

1. Technical Field

The present invention relates to an optical system; and more particularly, to an optical system for providing reference wavelengths.

2. Description of Related Art

There exist many applications where a very accurate measurement of the wavelength of an optical signal is required, particularly in high sensitivity sensing applications where measurement of the movement of the Bragg grating reflected wavelength by less than a picometer is required. Several different techniques and instrumentation packages have been devised which have the capacity to measure multiple wavelengths with sub-picometer accuracy, however, often these systems require a minimum of one known reference optical signal which is used to maintain the accuracy of the measurements. In systems where the wavelength range of operation is large, a set of reference signals may be required to maintain the accuracy over the entire band.

For example, FIG. 1 shows an optical signal generating scheme, which is based on the use of two broadband fiber Bragg gratings (FBGs) 6, 7 to form an etalon 8. FIGS. 1(a) and 1(b) show graphs of individual grating reflected spectrums of the Bragg gratings 6, 7 in the Bragg grating etalon shown in FIG. 1. If the gratings 6, 7 are written at the same wavelength a cavity is formed inbetween, and inside of this cavity certain multiple frequencies will resonate. The spacing between the resonating frequencies is given by the equation:

$$v_F = \frac{c}{2d},$$

where c is the speed of light and d is an effective spacing between the gratings. Therefore, depending on the spacing between the gratings 6, 7 a comb spectrum (not shown) of narrow optical signals can be created. This comb can then provide the basis for a set of precise reference optical signals. However, the above equation only applies if the optical frequency in the cavity is within the resonant conditions of the two Bragg gratings 6, 7. If the optical frequency is outside this region, the light will pass through the cavity unaffected. In certain applications this might be a desirable feature; however, for a set of reference optical frequencies, the unaffected light is undesirable. (Compare to the technique disclosed in U.S. Pat. No. 5,892,582, hereby incorporated by reference, where two mirrors are used to form an etalon.)

SUMMARY OF INVENTION

The problem in the prior art can be solved by chirping the Bragg gratings to produce a sufficiently broad Bragg grating etalon pair to cover all or most of the optical frequencies of interest. In so doing, all light entering the cavity will meet the resonance conditions of the Bragg grating etalon pair.

In particular, the present invention provides an optical system featuring a broadband source and a chirped Bragg grating etalon. The broadband source provides a broadband optical signal. The chirped Bragg grating etalon responds the broadband optical signal, for providing a chirped Bragg grating etalon optical signal having a precise set of the optical reference signals.

The chirped Bragg grating etalon may include a pair of chirped Bragg gratings.

The precise set of the optical reference signals is determined by the spacing of the chirped Bragg gratings of the chirped Bragg grating etalon. The precise set of the optical reference signals includes a series of peaks covering most of a source spectral width of the broad optical source signal with the power at the beginning and end of the spectrum passed unaffected by the chirped Bragg grating etalon due to the limited bandwidth thereof.

The optical system may also have an optical filter that responds to the chirped Bragg grating etalon optical signal, for providing an optical filter signal having the precise set of the optical reference signals. The optical filter includes an optical bandpass filter, an additional Bragg grating, a long period Bragg grating or a selective dielectric filter. When the optical bandpass filter is used, it responds to the chirped Bragg grating etalon optical signal, for providing an optical bandpass filter signal having the precise set of the optical reference signals.

In an alternative embodiment the optical filter may be in the form of a Bragg grating filter used in combination with an optical circulator (or coupler). In this case, the optical signal transmitted through the chirped Bragg grating etalon is introduced to the optical filter through the optical circulator (or coupler). The signal reflected from the optical filter has the precise set of the optical reference signals and is then transmitted back through the circulator (or coupler) where it is presented to the user.

The present invention provides a technique for providing a well defined set of reference optical signals for use in systems where a very accurate measurement of the wavelength of an optical signal is required.

The foregoing and other objects, features and advantages of the present invention will become more apparent in light of the following detailed description of exemplary embodiments thereof, as illustrated in the accompanying drawing.

BRIEF DESCRIPTION OF THE DRAWING

The drawing includes FIGS. 1-4, and the following is a brief description thereof:

FIG. 1 is a diagram of a known optical system having a Bragg grating etalon; FIGS. 1(a) and 1(b) show graphs of a wavelength versus an individual grating reflected power spectrum of Bragg gratings in the Bragg grating etalon shown in FIG. 1.

FIG. 2 is a diagram of an optical system having a chirped Bragg grating etalon that is the subject matter of the present invention.

FIG. 6 is a diagram of an alternative embodiment to that shown in FIG. 3 that is the subject matter of the present invention. FIG. 6(a) shows a graph as a function of a wavelength versus a power spectrum of an output signal from the broadband source shown in FIG. 6; FIG. 6(b) shows a graph as a function of a wavelength versus a power spectrum of an output signal from the chirped Bragg grating etalon shown in FIG. 6; and FIG. 6(c) shows a graph as a function of a wavelength versus a power spectrum of an output signal from the circulator shown in FIG. 6.

FIG. 7 is a diagram of an alternative embodiment to that shown in FIG. 3 that is the subject matter of the present invention. FIG. 7(a) shows a graph as a function of a wavelength versus a power spectrum of an output signal from the broadband source shown in FIG. 7; FIG. 7(b) shows a graph as a function of a wavelength versus a power spectrum of an output signal from the chirped Bragg grating etalon shown in FIG. 7; and FIG. 7(c) shows a graph as a function of a wavelength versus a power spectrum of an output signal from the coupler shown in FIG. 7.

DETAILED DESCRIPTION OF THE INVENTION

FIG. 2: The Basic Invention

Figure 3:
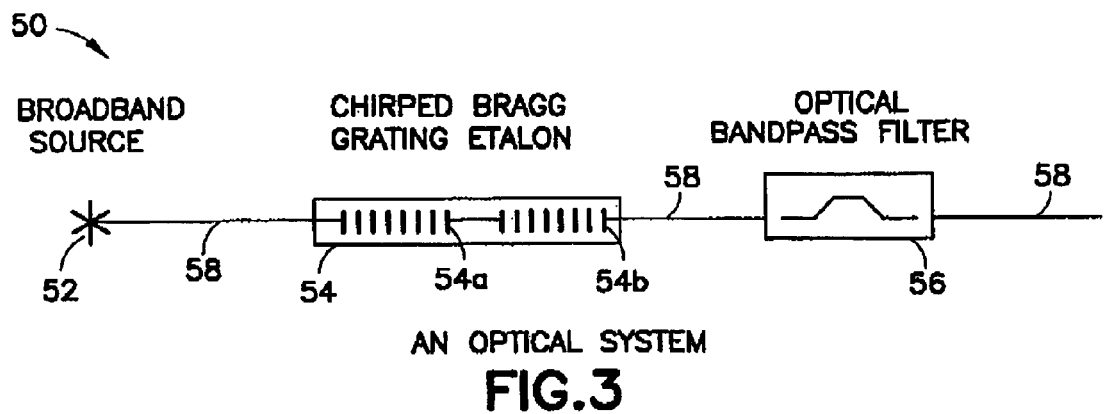
FIG. 3 is a diagram of one embodiment of an optical system that is the subject matter of the present invention.

FIG. 2 shows the basic invention, which provides an optical system generally indicated as 10 featuring a broadband source 12 and a chirped Bragg grating etalon 14.

The broadband source 12 provides a broadband optical signal. The broadband source is known in the art, and the scope of the invention is not intended to be limited to any particular kind or type thereof.

The chirped Bragg grating etalon 14 responds to the broadband optical signal, for providing a chirped Bragg grating etalon optical signal having a precise set of the optical reference signals to an optical fiber 18.

The chirped Bragg grating etalon 12 may include a pair of chirped Bragg gratings 14a, 14b, which are known in the art, formed in the optical fiber 18. A person skilled in the art would appreciate that the chirped Bragg gratings 14a, 14b will typically have a grating period that is about 1-2 microns, which is substantially shorter than a corresponding long-period Bragg grating. In contrast, long-period fiber gratings typically couple light from a core mode to a cladding mode, and have a grating period of about 10-100 times greater than the short-period grating. The scope of the invention is not intended to be limited to any particular chirped Bragg grating.

The precise set of the optical reference signals is determined by the spacing of the chirped Bragg gratings 14a, 14b in the chirped Bragg grating etalon 12. As shown and discussed in relation to FIG. 4(b), the precise set of the optical reference signals includes a series of peaks covering most of a source spectral width of the broad optical source signal with the power at the beginning and end of the spectrum passed unaffected by the chirped Bragg grating etalon due to the limited bandwidth thereof.

The optical system 10 may also have an optical filter 16 that responds to the chirped Bragg grating etalon optical signal, for providing an optical filter signal having the precise set of the optical reference signals. The optical filter 16 includes an optical bandpass filter, an additional Bragg grating, a long-period Bragg grating or a selective dielectric filter, such as a Bragg grating.

In an alternative embodiment, the optical filter may be in the form of a Bragg grating filter used in combination with an optical circulator, as discussed below in relation to FIG. 6.

Figure 4:
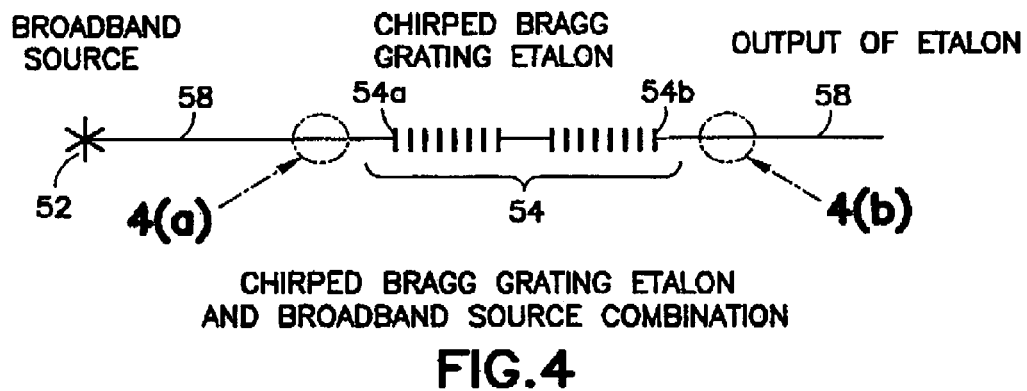
FIG. 4 is a diagram of a chirped Bragg grating etalon and the broadband source similar to that shown in FIGS. 2 and 3.
Figure 4A:
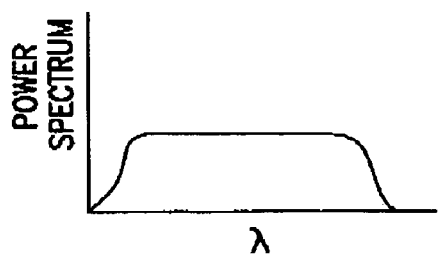
FIG. 4(a) shows a graph as a function of a wavelength versus a power spectrum of an output signal from the broadband source output signal shown in FIG. 4.

FIGS. 3, 4, 4(a), (4b), 5(a), 5(b)

FIG. 3 shows one embodiment of an optical system generally indicated as 50 featuring a broadband source 52, a chirped Bragg grating etalon 54 and an optical bandpass filter 56. See also FIG. 4.

Similar to that discussed above, the broadband source 52 provides a broadband optical signal. The chirped Bragg grating etalon 54 includes a Bragg grating etalon pair 54a, 54b, formed in an optical fiber 58, that responds to the broadband optical signal, for providing a chirped Bragg grating etalon optical signal having a precise set of the optical reference signals to the optical fiber 58.

The optical bandpass filter 56 responds to the chirped Bragg grating etalon optical signal, for providing an optical bandpass filter signal having the precise set of the optical reference signals.

Figure 4B:
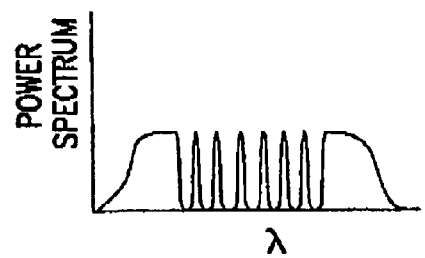
FIG. 4(b) shows a graph as a function of a wavelength versus a power spectrum of an output signal from the chirped Bragg grating etalon shown in FIG. 4.

In operation, the chirped Bragg grating etalon 54 is illuminated by the broadband source 52 with the transmitted signal passing through the optical bandpass filter 56 to produce the desired spectrum as shown and described in relation to FIG. 4(b), which shows the optical characteristics of such a device when illuminated with broadband light.

As described above, the Bragg gratings 54a, 54b of the chirped Bragg grating etalon 54 are written with sufficient bandwidth to cover most of the optical frequencies in the broadband source 52. The throughput of the chirped Bragg grating etalon 54 produces a series of peaks covering most of the source spectral width with the power at the beginning and end of the spectrum passed unaffected by the device due to the limited bandwidth of the chirped Bragg gratings 54a, 54b. The optical power not transmitted by the chirped Bragg grating etalon 54 is reflected back towards the source. Additionally, the number of peaks in a given optical frequency range is customizable, since the spacing between the chirped Bragg gratings 54a, 54b (parameter d in equation 1 above) determines the spacing of the optical peaks or comb. If the peaks are accurately measured and a calibration is obtained for the etalon, the transmitted optical spectrum can then serve as the basis for a precise set of optical references.

To achieve the final comb of optical frequencies, the power which remains in the beginning and end of the source spectral profile must be eliminated. This can be achieved through the use of an optical filter, such as the optical bandpass filter 56, to pass only the central strong peaks which a system can reliably detect.

Figure 5:
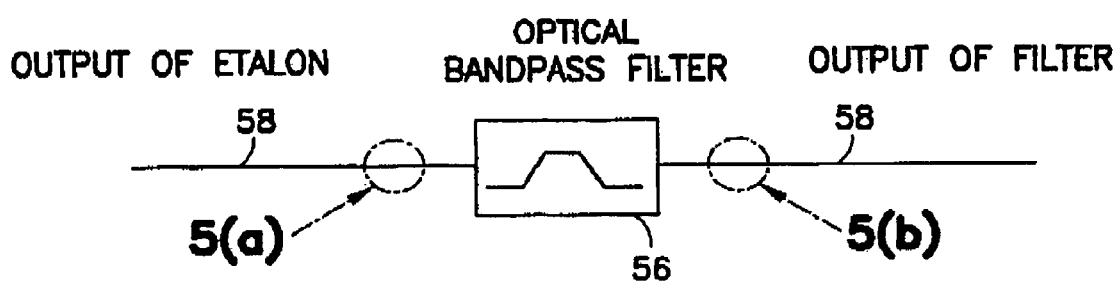
FIG. 5 is a diagram of the optical bandpass filter similar to that shown in FIG. 3.
Figure 5A:
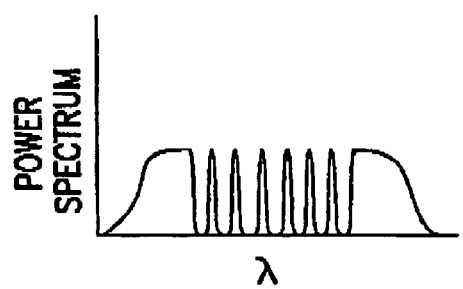
FIG. 5(a) shows a graph as a function of a wavelength versus a power spectrum of an output signal from the chirped Bragg grating etalon shown in FIG. 5.
Figure 5B:
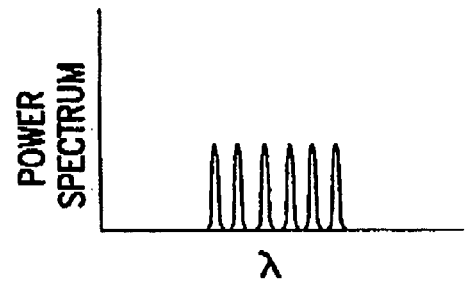
FIG. 5(b) shows a graph as a function of a wavelength versus a power spectrum of an output signal from the optical bandpass filter shown in FIG. 5.

FIG. 5(b) shows a final filtered output from the optical bandpass filter 56.

FIG. 6

FIG. 6 shows an alternative design generally indicated as 100 having a broadband source 102, a chirped Bragg grating 104 with chirped Bragg gratings 104a, 104b, an optical circulator 106, an optical fiber 108, and a filter Bragg grating 110. The broadband source 102 and the chirped Bragg grating etalon 104 with chirped Bragg gratings 104a, 104b operate similar to that discussed above in relation to FIGS. 2–4 above.

In this embodiment, the optical filter may be in the form of the Bragg grating filter 110 used in combination with the optical circulator 106. The transmitted signal from the chirped Bragg grating etalon 104 is passed through the circulator 106 (into port 1, out port 2) and onto the filter Bragg grating 110. The filter Bragg grating 110 acts as a selective reflective filter to only reflect the peaks of interest. The reflected signal is directed back through the circulator 106 and is output on port 3.

A person skilled in the art would appreciate that an optical coupler could be used in place of the circulator (FIG. 7) to produce the same result.

FIG. 7

FIG. 7 shows an alternative design generally indicated as 200 having a broadband source 202, a chirped Bragg grating 204 with chirped Bragg gratings 204*a*, 204*b*, an optical coupler 206, an optical fiber 208, and a filter Bragg grating 210. The broadband source 202 and the chirped Bragg grating etalon 204 with chirped Bragg gratings 204*a*, 204*b* operate similar to that discussed above in relation to FIGS. 2–4 and 6 above. In this embodiment, the optical filter may be in the form of the Bragg grating filter 210 used in combination with the optical coupler 206. The transmitted signal from the chirped Bragg grating etalon 204 is passed through the coupler 206 and onto the filter Bragg grating 210. The filter Bragg grating 210 acts as a selective reflective filter to only reflect the peaks of interest. The reflected signal is directed back through the circulator 206 and is output port.

Temperature and Strain Compensation

The Bragg gratings 14*a*, 14*b*; 54, 54*b*; 104*a*, 104*b*; 204*a*, 204*b* as well as the etalon 14; 54; 104; 204 itself, are temperature and strain sensitive such that either of those two parameters will change the optical characteristics of the comb spectrum passed by the overall system or device 10; 50; 100; 200. If the comb must be used as absolute wavelength references, then these two parameters must be controlled or eliminated in the etalon 14; 54; 104; 204 or conversely the parameters must be externally measured and an appropriate correction factor applied to the measured references.

In a first approach, the overall system or device 10; 50; 100; 200 could be placed in a temperature compensating package, such as that described in U.S. patent application Ser. No. 09/519,240, filed Mar. 6, 2000, entitled "Temperature Compensated Optical Device," hereby incorporated by reference herein. This package would isolate the device from any external strain while additionally providing a method to compensate for any temperature induced changes in the device. The temperature compensation can be done using a variety of methods, such as packaging the device using a material which would induce a strain on the device to exactly cancel the effects of temperature.

Alternatively, a strain isolated package could be used and the temperature of the overall package could be controlled using a precision controller, such as a thermal cooler/heater element (TCE) which is known in the art.

A simpler approach would be to place the device in a strain isolated package and use a precise measurement of the temperature of the package to correct any changes. See U.S. patent application Ser. No. 09/448,367, filed Nov. 23, 1999, entitled "Grating Reference Sensor for Precise Reference Temperature Measurement," hereby incorporated by reference herein. A calibration of the device would be required over the operation range of the device and then used to provide the correction during use.

In all configurations of the system or device, care must be taken to prevent strain gradients from occurring over the length of the etalon. Such gradients will induce errors which cannot easily be corrected. Additionally, care must be used in the attachment process used to attach the etalon to the outer package. Creep in the attachment or drift due to effect such as coatings on the device and annealing must be eliminated to maintain the accuracy required. Various packaging schemes can be used, such as encapsulation of the annealed stripped etalon in a quartz shell that can provide a creep free attachment means.

SCOPE OF THE INVENTION

Although the invention has been described and illustrated with respect to exemplary embodiments thereof, the foregoing and various other additions and omissions may be made therein and thereto without departing from the spirit and scope of the present invention.

The invention claimed is:

1. An optical system, comprising:
   a broadband source for providing a broadband optical signal; and
   a chirped Bragg grating etalon, responsive to the broadband optical signal, for providing a chirped Bragg grating etalon optical signal having a precise set of optical reference signals.

2. An optical system according to claim 1, wherein the chirped Bragg grating etalon includes a pair of chirped Bragg gratings.

3. An optical system according to claim 2, wherein the precise set of the optical reference signals is determined by the spacing of the chirped Bragg gratings of the chirped Bragg grating etalon.

4. An optical system according to claim 1, wherein the precise set of the optical reference signals includes a series of peaks covering most of a source spectral width of the broad optical source signal with the power at the beginning and end of the spectrum passed unaffected by the chirped Bragg grating etalon due to the limited bandwidth thereof.

5. An optical system according to claim 1, wherein the optical system further comprises an optical filter that responds to the chirped Bragg grating etalon optical signal, for providing an optical filter signal having the precise set of the optical reference signals.

6. An optical system according to claim 5, wherein the optical filter includes an optical bandpass filter.

7. An optical system according to claim 5, wherein the optical filter includes an additional Bragg grating.

8. An optical system according to claim 5, wherein the optical filter includes a long-period Bragg grating.

9. An optical system according to claim 5, wherein the optical filter includes a selective dielectric filter.

10. An optical system according to claim 9, wherein the selective dielectric filter is a Bragg grating.

11. An optical system according to claim 1, wherein the optical system further comprises an optical bandpass filter that responds to the chirped Bragg grating etalon optical signal, for providing an optical bandpass filter signal.

12. The optical system according to claim 1, further comprising:
   an optical filter, responsive to the chirped Bragg grating etalon optical signal, for providing at least a portion of the precise set of the optical reference signals to an output port.

13. The optical system according to claim 12, further comprising:
an optical directional device for directing the chirped Bragg grating etalon optical signal to the optical filter, and directing the at least a portion of the precise set of the optical reference signals to the output port.

14. The optical system according to claim 13, wherein the optical directional device includes one of an optical circulator and an optical coupler.

15. The optical system according to claim 12, wherein the optical filter includes a Bragg grating filter for reflecting the at least a portion of the precise set of the optical reference signals to an output port.

16. An optical source according to claim 1, wherein
the precise set of the optical reference signals includes a series of peaks covering most of a source spectral width of the broadband source; and
the broadband source has a spectrum and the power at the beginning and end of the spectrum is passed substantially unaffected by the chirped Bragg grating etalon.

17. An optical source, comprising:
a broad band source that provides a broadband optical signal; and
an etalon including an optical waveguide having a pair of chirped Bragg gratings disposed therein, wherein the pair of chirped Bragg gratings are optically spaced a predetermined distance to provide a desired filter profile.

18. An optical source according to claim 17, wherein the desired filter profile includes a precise set of optical reference signals.

19. An optical source according to claim 18, wherein the precise set of the optical reference signals includes a series of peaks covering most of a source spectral width of the broadband source.

20. An optical source according to claim 19, wherein the broadband source has a spectrum and the power at the beginning and end of the spectrum is passed substantially unaffected by the etalon.

* * * * *